US010428777B2

(12) United States Patent
Kato et al.

(10) Patent No.: US 10,428,777 B2
(45) Date of Patent: Oct. 1, 2019

(54) FUEL INJECTION DEVICE

(71) Applicant: DENSO CORPORATION, Kariya, Aichi-pref. (JP)

(72) Inventors: Masaaki Kato, Kariya (JP); Takamasa Yokota, Kariya (JP)

(73) Assignee: DENSO CORPORATION, Kariya (JP)

( * ) Notice: Subject to any disclaimer, the term of this patent is extended or adjusted under 35 U.S.C. 154(b) by 46 days.

(21) Appl. No.: 15/579,328

(22) PCT Filed: May 18, 2016

(86) PCT No.: PCT/JP2016/002416
§ 371 (c)(1),
(2) Date: Dec. 4, 2017

(87) PCT Pub. No.: WO2016/199354
PCT Pub. Date: Dec. 15, 2016

(65) Prior Publication Data
US 2018/0355827 A1    Dec. 13, 2018

(30) Foreign Application Priority Data
Jun. 9, 2015 (JP) ................................ 2015-116935

(51) Int. Cl.
*F02M 21/00* (2006.01)
*F02M 47/00* (2006.01)
(Continued)

(52) U.S. Cl.
CPC .......... *F02M 47/00* (2013.01); *F02D 19/022* (2013.01); *F02D 19/024* (2013.01);
(Continued)

(58) Field of Classification Search
CPC .............. F02M 47/00; F02M 21/0212; F02M 21/0278; F02M 21/0287; F02M 21/0245;
(Continued)

(56) References Cited

U.S. PATENT DOCUMENTS 9,677,519 B2 * 6/2017 Song .................. F02M 21/0212
2003/0230249 A1 * 12/2003 Yamaoka ............... F02M 37/20
123/1 A
(Continued)

FOREIGN PATENT DOCUMENTS

JP    S63-016161    1/1988
JP    2002-322970   11/2002
(Continued)

*Primary Examiner* — Hai H Huynh
(74) *Attorney, Agent, or Firm* — Nixon & Vanderhye P.C.

(57) ABSTRACT

A fuel injection device that injects a liquefied gas fuel from an injection port to a combustion chamber of the internal combustion engine includes a passage forming member configured to define a fuel passage through which the liquefied gas fuel flows to the injection port, a temperature regulating unit configured to adjust a temperature of the liquefied gas fuel flowing through the fuel passage according to an operation state of the internal combustion engine, and a pressure regulating unit configured to adjust a pressure of the liquefied gas fuel flowing through the fuel passage according to the operation state of the internal combustion engine.

12 Claims, 6 Drawing Sheets

(51) Int. Cl.
  F02M 61/16    (2006.01)
  F02D 19/06    (2006.01)
  F02M 21/02    (2006.01)
  F02M 61/18    (2006.01)
  F02M 47/02    (2006.01)
  F02M 53/04    (2006.01)
  F02D 19/02    (2006.01)
  F02M 69/46    (2006.01)

(52) U.S. Cl.
  CPC ..... *F02D 19/0647* (2013.01); *F02M 21/0212* (2013.01); *F02M 21/0278* (2013.01); *F02M 21/0287* (2013.01); *F02M 47/027* (2013.01); *F02M 53/043* (2013.01); *F02M 61/16* (2013.01); *F02M 61/1813* (2013.01); *F02M 21/0239* (2013.01); *F02M 21/0245* (2013.01); *F02M 69/465* (2013.01)

(58) Field of Classification Search
  CPC .......... F02M 21/0239; F02M 61/1813; F02M 61/16; F02M 69/465; F02D 19/0647

USPC ......................................... 123/525, 527, 530
  See application file for complete search history.

(56) References Cited

U.S. PATENT DOCUMENTS

| | | | |
|---|---|---|---|
| 2004/0231618 | A1 | 11/2004 | Shinkarenko et al. |
| 2011/0214644 | A1* | 9/2011 | Barta ..................... F02M 37/04 123/512 |
| 2016/0123276 | A1* | 5/2016 | Tsujino .............. F02M 21/0245 137/565.16 |

FOREIGN PATENT DOCUMENTS

| | | |
|---|---|---|
| JP | 2002-322971 | 11/2002 |
| JP | 2002-332933 | 11/2002 |
| JP | 2004-138026 | 5/2004 |
| JP | 2008-031966 | 2/2008 |
| JP | 2012-092697 | 5/2012 |
| JP | 2012-193637 | 10/2012 |
| WO | WO 2003/081019 | 10/2003 |

* cited by examiner

FUEL INJECTION DEVICE

This application is the U.S. national phase of International Application No. PCT/JP2016/002416 filed May 18, 2016 which designated the U.S. and claims priority to Japanese Patent Application No. 2015-116935 filed on Jun. 9, 2015, the entire contents of each of which are incorporated herein by reference.

CROSS REFERENCE TO RELATED APPLICATION

This application is based on Japanese Patent Application No. 2015-116935 filed on Jun. 9, 2015, the disclosure of which is incorporated herein by reference.

TECHNICAL FIELD

The present disclosure relates to a fuel injection device that injects a fuel from an injection port.

BACKGROUND ART

Conventionally, it is known that a fuel injection device can switch an injection rate of a fuel based on an operation state of an internal combustion engine. For example, Patent Literature 1 discloses a fuel injection device that switches between an operating state where a total number of injection ports injecting the fuel is small and an operating state where the total number of the injection ports injecting the fuel is large, according to an operation state of an internal combustion engine.

PRIOR ART LITERATURES

Patent Literature

Patent Literature 1: JP2002-322971A

SUMMARY OF INVENTION

According to the above configuration in Patent Literature 1, only two operating states are switched according to the operation state of the internal combustion engine. Thus, it is difficult that a spray injected from the fuel injection device actually suit the operation state of the internal combustion engine.

It is an object of the present disclosure to provide a fuel injection device which can execute an injection of a fuel to suit an operation state of an internal combustion engine.

According to an aspect of the present disclosure, the fuel injection device that injects a liquefied gas fuel from an injection port to a combustion chamber of an internal combustion engine includes a passage forming member configured to define a fuel passage through which the liquefied gas fuel flows to the injection port, a temperature regulating unit configured to adjust a temperature of the liquefied gas fuel flowing through the fuel passage according to an operation state of the internal combustion engine, and a pressure regulating unit configured to adjust a pressure of the liquefied gas fuel flowing through the fuel passage according to the operation state of the internal combustion engine.

The inventors of the present disclosure considered the liquefied gas fuel that is a gas being liquefied. When the pressure and the temperature are adjusted, it is possible that a remarkable change of a density of the liquefied gas fuel occurs. When the temperature regulating unit decreases the temperature of the liquefied gas fuel and the pressure regulating unit increases the pressure of the liquefied gas fuel, the density of the liquefied gas fuel becomes high. Thus, a mass injection rate (injection rate) of the fuel injected from the injection port can become high, and the spray can have a strong penetration force.

When the temperature regulating unit increases the temperature of the liquefied gas fuel and the pressure regulating unit decreases the pressure of the liquefied gas fuel, the density of the liquefied gas fuel becomes low. Thus, the injection rate of the fuel injected from the injection port can become low, and the spray can be maintained to have a weak penetration force. As the above description, the fuel injection device that injects the liquefied gas fuel can execute the injection of the spray to suit the operation state of the internal combustion engine by adjusting the temperature and the pressure of the liquefied gas fuel of the fuel passage using the temperature regulating unit and the pressure regulating unit to suit the operation state of the internal combustion engine.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
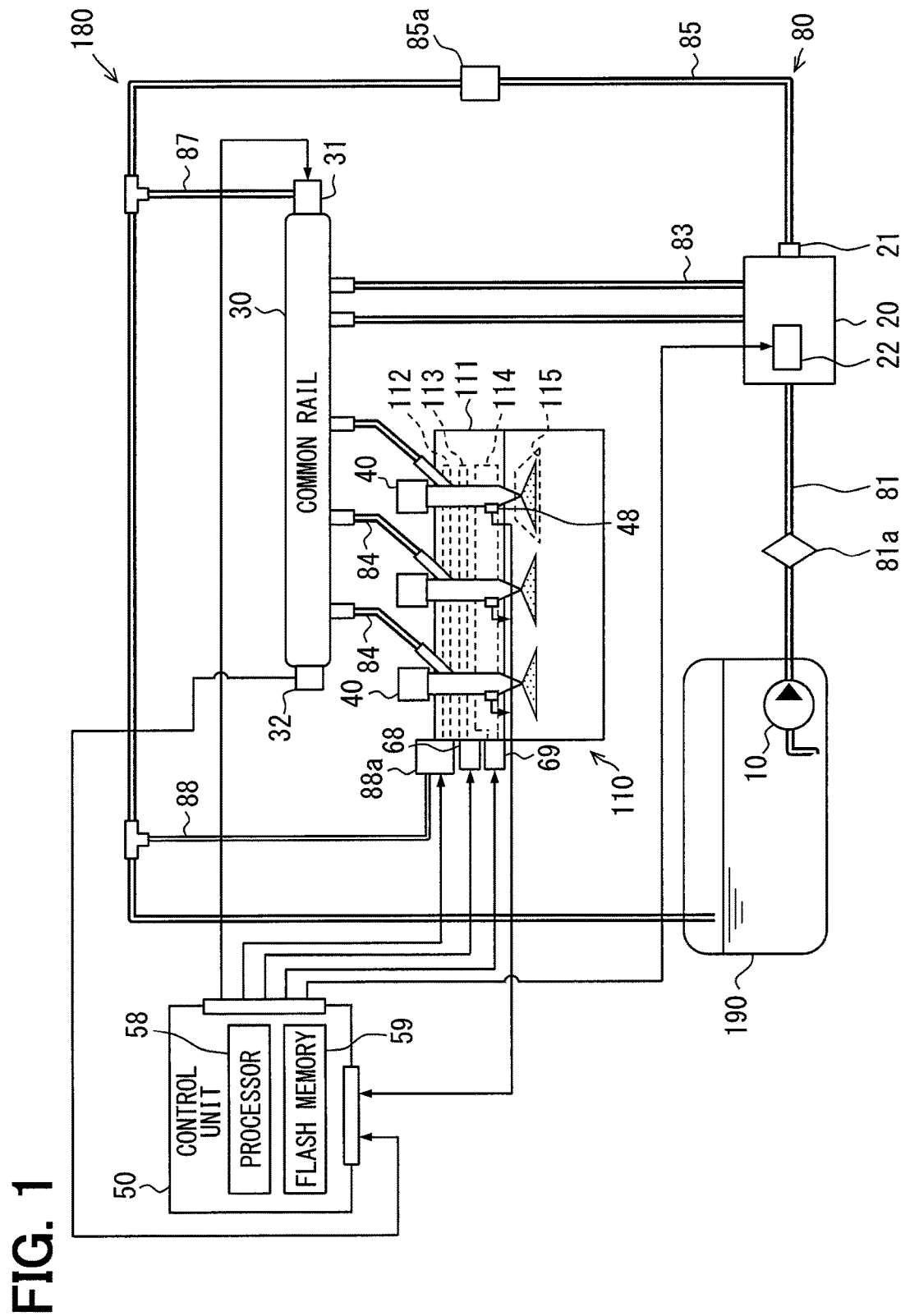
FIG. 1 is a diagram showing an outline of a fuel injection device, an internal combustion engine and a fuel supply system, according to a first embodiment of the present disclosure.

Hereafter, referring to drawings, embodiments of the present disclosure will be described. The substantially same parts or components as those in the embodiments are indicated with the same reference numerals and the same descriptions may be omitted. When only a part of a configuration in each embodiment is described, the other parts of the configuration can be configured as the same as a prior embodiment. Further, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

First Embodiment

Figure 2:
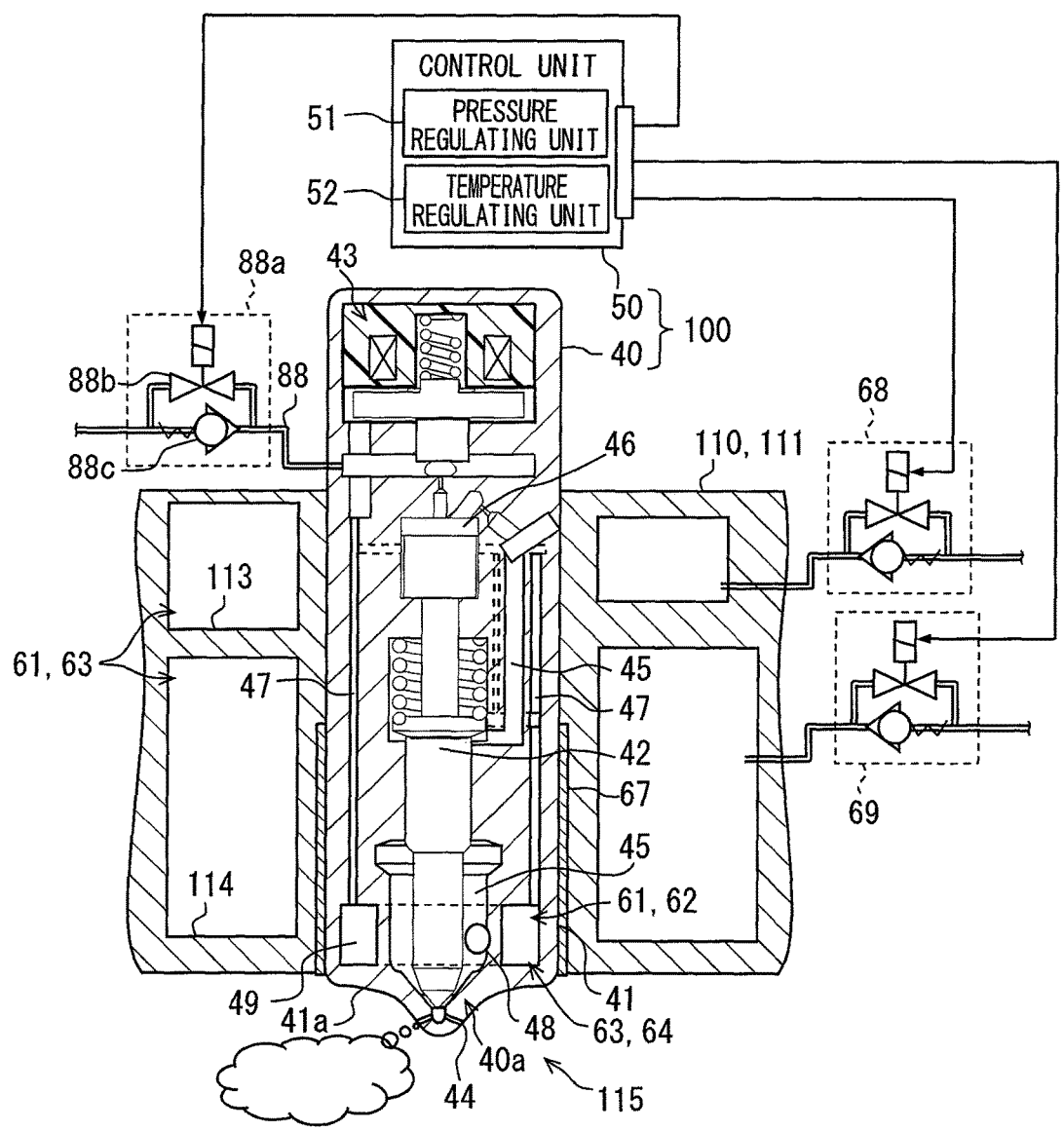
FIG. 2 is a cross-sectional view showing a constitution of a periphery of an injector.

According to a first embodiment of the present disclosure, as shown in FIGS. 1 and 2, a fuel injection device 100, a fuel tank 190, an internal combustion engine 110 and a fuel supply system 180 are mounted to a vehicle. The fuel injection device 100 includes injectors 40 and a control unit 50. The fuel injection device 100 injects a dimethyl ether (DME) that is one type of a liquefied gas fuel from an injection port 44 of the injector 40 to a combustion chamber 115 to supply a DME fuel that is necessary in a combustion to each cylinder.

The injector 40 has the injection port 44 exposed to the combustion chamber 115 when the injector 40 is inserted into a through hole in a cylinder head 111 of the internal combustion engine 110. The injector 40 includes a valve mechanism that controls an injection of the DME fuel injected from the injection port 44. The valve mechanism includes a pressure control valve 43 that operates based on a control signal transmitted from the control unit 50 and a main valve portion 40a that opens and closes the injection port 44. The injector 40 uses a part of the DME fuel supplied from the fuel supply system 180 to open and close the injection port 44. The injector 40 includes a nozzle body 41, a nozzle needle 42 and the pressure control valve 43.

The nozzle body 41 is made of a metal material including a chromium-molybdenum steel and is a bottomed cylindrical shape. The nozzle body 41 includes the injection port 44, a high-pressure fuel passage 45, a pressure control chamber 46 and a return fuel passage 47. Plural injection ports 44 are located at a tip end of the nozzle body 41. Each injection port 44 is a Laval shape. The high-pressure fuel passage 45 is a fuel passage through which the DME fuel supplied to the combustion chamber 115 flows to the injection port 44. The pressure control chamber 46 changes a pressure according to an inflow and an outflow of the DME fuel at a high pressure. The injector 40 controls a movement of the nozzle needle 42 by using a fuel pressure of the pressure control chamber 46. The return fuel passage 47 is a fuel passage through which the DME fuel discharged from the pressure control chamber 46 and the DME fuel used in a cooling or a lubrication of the nozzle needle 42 and the pressure control valve 43 flow to an exterior of the injector 40.

The nozzle needle 42 is made of a metal material including a high speed tool steel and is a columnar shape. In the nozzle body 41, the high-pressure fuel passage 45 receives the nozzle needle 42, and the nozzle needle 42 reciprocates in an axial direction of the nozzle body 41. The nozzle needle 42 has a tip end surface that constitutes the main valve portion 40a opening and closing the injection port 44 together with a bottom wall surface of the nozzle body 41. The nozzle needle 42 is seated on or separated from the bottom wall surface of the nozzle body 41 by the tip end surface according to a variation of the fuel pressure of the pressure control chamber 46.

The pressure control valve 43 is an electromagnetic valve that opens and closes based on the control signal transmitted from the control unit 50. The pressure control valve 43 controls the fuel pressure of the pressure control chamber 46. When the pressure control valve 43 becomes in an open state, the injection port 44 becomes in an open state by a valve opening displacement of the nozzle needle 42 following a pressure deterioration of the pressure control chamber 46. When the pressure control valve 43 becomes in a closed state, the injection port 44 becomes in a closed state by a valve closing displacement of the nozzle needle 42 following a pressure increasing of the pressure control chamber 46.

The control unit 50 is constituted by a microcomputer including a processor 58 that is used as a calculation circuit, a RAM and a flash memory 59, and a driving circuit of the injector 40. The flash memory 59 stores a program and a control map which are used to control the internal combustion engine 110. In addition, the microcomputer can include a non-transitional substantial storage media other than the flash memory 59.

The control unit 50 is electrically connected with various sensors including a rotation speed sensor that senses a rotation speed of the internal combustion engine 110 and an accelerator position sensor that senses an operation quantity of an accelerator pedal according to a driver. The control unit 50 is electrically connected with various actuators including the pressure control valve 43 of the injector 40 and an electromagnetic valve 22 of a supply pump 20. The control unit 50 estimates an operation target of the internal combustion engine 110 obtained based on an operation of the driver and the operation state of the internal combustion engine 110, based on information obtained from the above various sensors. The control unit 50 generates the control signal used to change the operation state of the internal combustion engine 110 to the operation target and outputs the control signal to the actuators including the pressure control valve 43 of each injector 40 and the electromagnetic valve 22.

The fuel tank 190 stores the DME. A DME fuel in the fuel tank 190 is compressed by a pressure in response to a fuel vapor pressure to be liquefied. The fuel tank 190 includes a safety valve. When a pressure in the fuel tank 190 exceeds an upper limit pressure that is predetermined, the safety valve opens. According to the present disclosure, the DME fuel may be referred to as a fuel.

The internal combustion engine 110 is located in an engine room of the vehicle. The internal combustion engine 110 is a diesel engine. In the internal combustion engine 110, the DME fuel injected by an injector 40 arranged in each cylinder is compressed in the cylinder. The internal combustion engine 110 converts a heat energy of the DME fuel combusting by a compression in each combustion chamber 115 into a power.

The fuel supply system 180 includes a fuel line 80, a common rail 30, a feed pump 10 and the supply pump 20. The fuel line 80 includes fuel passages through which the DME fuel flows between the fuel tank 190 and the injector 40. The fuel line 80 includes a low-pressure pipe 81, a high-pressure pipe 83, a distribution pipe 84, a pump return pipe 85, a rail return pipe 87 and an injector return pipe 88. The above pipes are constituted by hose members that are made of a rubber reinforced by a polyester or an aramid and tubular members that are made of a metal material and are bent.

The low-pressure pipe 81 is connected with the feed pump 10 and the supply pump 20. The low-pressure pipe 81 defines a low-pressure fuel passage through which the DME fuel stored in the fuel tank 190 flows from the feed pump 10 to the supply pump 20. The low-pressure pipe 81 includes a fuel filter 81a. The fuel filter 81a can remove a foreign matter from the DME fuel flowing through the low-pressure fuel passage.

The high-pressure pipe 83 is connected with the supply pump 20 and the common rail 30. The high-pressure pipe 83 defines a high-pressure fuel passage through which the DME fuel having a high pressure and discharged by the supply pump 20 flows to the common rail 30. The distribution pipe 84 is connected with the common rail 30 and each injector 40. The distribution pipe 84 defines a distribution passage through which the DME fuel having the high pressure and stored in the common rail 30 flows to each injector 40.

The pump return pipe 85 is connected with a leakage fuel discharging portion 21 that discharges a surplus fuel of the supply pump 20, and is connected with the fuel tank 190. The pump return pipe 85 defines a return passage through which a leakage fuel discharged from the leakage fuel discharging portion 21 flows toward the fuel tank 190. The pump return pipe 85 includes an overflow valve 85a that opens in a case where the fuel pressure exceeds a threshold pressure. According to the present embodiment, the threshold pressure is around 3 MPa.

The rail return pipe 87 is connected with the common rail 30 and the pump return pipe 85. The rail return pipe 87 defines a passage through which a surplus fuel discharged from the common rail 30 flows into the return passage in a case where a regulating valve 31 opens. The injector return pipe 88 is connected with a head gallery 112 located in the cylinder head 111 and the pump return pipe 85. The injector return pipe 88 defines a passage through which the DME fuel discharged by the head gallery 112 flows into the return passage. As the above description, the surplus fuel joins the DME fuel in the return passage through the passage defined by the rail return pipe 87, and the leakage fuel joins the surplus fuel in the return passage through the passage defined by the injector return pipe 88.

The common rail 30 is a member that is made of a metal material such as a ferrous material and is a tubular shape. The common rail 30 stores the DME fuel supplied by the fuel supply system 180 and maintains the pressure of the DME fuel. The common rail 30 supplies the DME fuel to each injector 40. The common rail 30 includes a rail pressure sensor 32 and the regulating valve 31 that are electrically connected with the control unit 50. The rail pressure sensor 32 outputs an output according to a rail pressure in the common rail 30 toward the control unit 50. The control unit 50 controls the regulating valve 31 to open in a case where the rail pressure sensed by the rail pressure sensor 32 exceeds an upper limit pressure that is predetermined.

The feed pump 10 is an electric pump located in the fuel tank 190. The feed pump 10 suctions the DME fuel stored in the fuel tank 190 by using a power of an electric motor. The feed pump 10 compresses the DME fuel by adding a feed pressure, and then feeds the DME fuel toward the supply pump 20 through the low-pressure fuel passage. According to the present embodiment, the feed pressure is around 3 MPa.

The supply pump 20 that is a plunger pump is driven by the internal combustion engine 110. The supply pump 20 suctions the DME fuel discharged from the feed pump 10 into a compression chamber. The supply pump 20 compresses the DME fuel of the compression chamber by a plunger that reciprocates according to the power of the internal combustion engine 110. Thus, the DME fuel that is compressed is fed from the supply pump 20 toward the common rail 30. The supply pump 20 includes the electromagnetic valve 22 and the leakage fuel discharging portion 21. The electromagnetic valve 22 controls a supply quantity that is a quantity of the DME fuel supplied to the compression chamber. The leakage fuel discharging portion 21 discharges the leakage fuel generated at the supply pump 20 to the pump return pipe 85.

Figure 3:
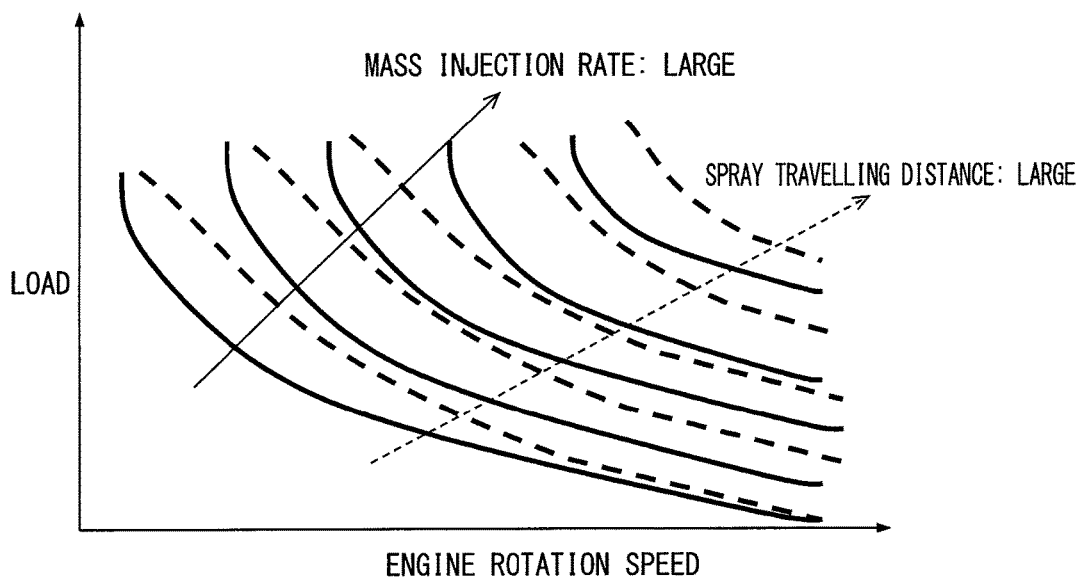
FIG. 3 is a graph showing a relationship between an operation state of the internal combustion engine, an injection rate that is requested and a spray travelling distance.
Figure 4:
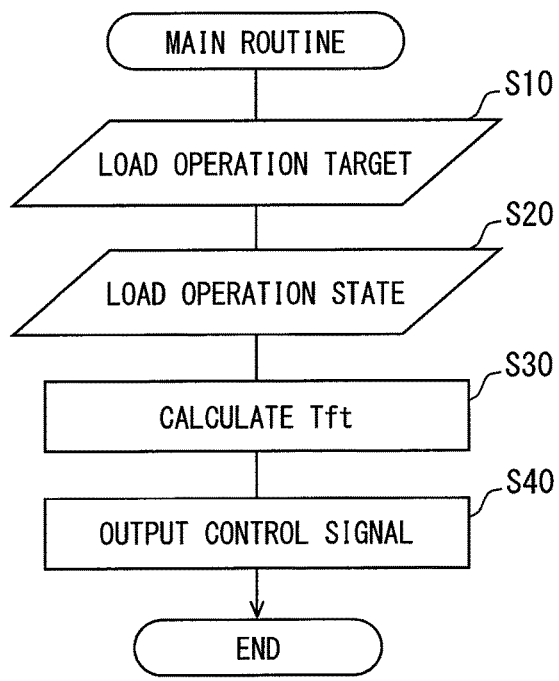
FIG. 4 is a flowchart showing a main routine of a temperature regulating operation of a DME fuel.

As shown in FIG. 3, a requested value of an injection rate (mass injection rate) that is requested by the fuel injection device 100 increases in accordance with an increase in rotation speed of the internal combustion engine 110 and an increase in load of the internal combustion engine 110. Similarly, a requested value of a spray travelling distance increases in accordance with an increase in rotation speed of the internal combustion engine 110 and an increase in load of the internal combustion engine 110. As shown in FIGS. 1 and 2, the fuel injection device 100 can change the injection rate and the spray travelling distance of a spray injected from the injection port 44 having a specified shape according to the operation state of the internal combustion engine 110, without using an injection port having a variable shape.

The fuel injection device 100 uses a phenomenon that a density and a sound speed of the DME fuel remarkably change in a liquid-phase region and a super-critical region where the temperature of the DME fuel is in a range from an outer side temperature to 200 degrees Celsius and the pressure of the DME fuel is in a range from 20 MPa to 100 MPa. When the temperature of the DME fuel is decreased and the pressure of the DME fuel is increased, the DME fuel becomes in a state where the sound speed is high and the density is high. Thus, an injection of the spray having a high injection rate and a strong penetration force is achieved. When the temperature of the DME fuel is increased and the pressure of the DME fuel is decreased, the DME fuel becomes in a state where the sound speed is low and the density is low. Thus, an injection of the spray having a low injection rate and a weak penetration force is achieved. Specifications of configurations achieving the above sprays will be described hereafter, The injector 40 can positively exchange heat with the internal combustion engine 110 to adjust the temperature of the DME fuel flowing through the high-pressure fuel passage 45. The injector 40 includes a fuel temperature sensor 48 and a fuel gallery 49. A copper tube 67 is located at a periphery of the injector 40.

The fuel temperature sensor 48 is a thermocouple and a thermostat. The fuel temperature sensor 48 is electrically connected with the control unit 50. The fuel temperature sensor 48 is located outward of an outer periphery of the fuel gallery 49 in an outer peripheral surface of the nozzle body 41. The fuel temperature sensor 48 outputs an output according to the fuel temperature in the fuel gallery 49 toward the control unit 50.

The fuel gallery 49 that is a ring shape is located at a tip end portion of the nozzle body 41. The fuel gallery 49 surrounds the entire of an outer periphery of the high-pressure fuel passage 45. The fuel gallery 49 is connected with the return fuel passage 47 through plural positions. The fuel gallery 49 defines a fuel passage through which the DME fuel flows around the high-pressure fuel passage 45. The DME fuel (return fuel) having a low pressure and a low temperature flows into the fuel gallery 49 rather than the DME fuel of the high-pressure fuel passage 45. The temperature of the DME fuel stored in the fuel gallery 49 is adjusted to be in a range from 40 degrees Celsius to 120 degrees Celsius. The DME fuel of the fuel gallery 49 and the DME fuel of the return fuel passage 47 are discharged to the injector return pipe 88 through the head gallery 112. The injector return pipe 88 includes a gallery control valve 88a.

The gallery control valve 88a has a function that adjusts the pressure and the temperature of the DME fuel in the fuel gallery 49, the return fuel passage 47 and the head gallery 112. The gallery control valve 88a switches between a communication state and a shut-off state. In the communication state, the gallery control valve 88a allows a communication between the head gallery 112 and the return passage. In the shut-off state, the gallery control valve 88a interrupts the communication between the head gallery 112 and the return passage. The gallery control valve 88a adjusts an outflow volume of the DME fuel moving from each fuel gallery 49 to the head gallery 112 and flowing into the injector return pipe 88.

The gallery control valve 88a includes an electromagnetic valve portion 88b and a safety valve portion 88c that are connected in a parallel connection. The electromagnetic valve portion 88b is electrically connected with the control unit 50. The electromagnetic valve portion 88b opens and closes based on the control signal transmitted from the control unit 50. The electromagnetic valve portion 88b is a duty control valve, and a valve opening rate of the electromagnetic valve portion 88b is controlled by an on-duty ratio of the control signal. When the fuel pressure in the head gallery 112 exceeds a threshold pressure that is predetermined, the safety valve portion 88c opens.

The copper tube 67 is a tubular member made of a copper that has a thermal conductivity higher than that of the nozzle body 41 and the cylinder head 111. The copper tube 67 is interposed between an outer peripheral wall of the nozzle body 41 and an inner peripheral wall of the through hole located in the cylinder head 111. The copper tube 67 surrounds the outer periphery of the fuel gallery 49. The copper tube 67 has an end in an axial direction of the copper tube 67, and the end is exposed to the combustion chamber 115. As the above configuration, a combustion heat transmitted to the end of the copper tube 67 and a heat receiving surface 41a of the nozzle body 41 that is a surface exposed to the combustion chamber 115 is efficiently transmitted to the DME fuel of the fuel gallery 49.

The cylinder head 111 further includes a water gallery 113, an oil gallery 114, a coolant control valve 68 and an oil control valve 69. The water gallery 113 and the oil gallery 114 located at a periphery of the high-pressure fuel passage 45 surrounds the high-pressure fuel passage 45.

A coolant cooling the internal combustion engine 110 flows through the water gallery 113. A temperature of the coolant flowing through the water gallery 113 is around 80 degrees Celsius. The water gallery 113 is partitioned to be arranged with the oil gallery 114 in the axial direction of the nozzle body 41. The oil gallery 114 is interposed between the water gallery 113 and the combustion chamber 115.

A lubricating oil that cools and lubricates the internal combustion engine 110 flows through the oil gallery 114. A length of the oil gallery 114 in an axial direction of the injector 40 is longer than a length of the water gallery 113 in the axial direction. An oil temperature of the lubricating oil flowing through the oil gallery 114 is around a range from 80 degrees Celsius to 120 degrees Celsius.

The coolant control valve 68 controls a flow volume of the coolant flowing through the water gallery 113. The oil control valve 69 controls a flow volume of the lubricating oil flowing through the oil gallery 114. Both the coolant control valve 68 and the oil control valve 69 include an electromagnetic valve portion and a safety valve portion that are connected in a parallel connection. Each electromagnetic valve portion is electrically connected with the control unit 50. Each electromagnetic valve portion opens and closes based on the control signal transmitted from the control unit 50. When the pressure in the water gallery 113 or the pressure in the oil gallery 114 exceeds a threshold pressure that is predetermined, corresponding safety valve portion opens. In addition, the coolant control valve 68 and the oil control valve 69 may use a configuration including a duty control valve similar to the gallery control valve 88a, a proportional control solenoid or a one-way throttle valve.

Next, a specification of the control unit 50 controlling the above members will be described. The control unit 50 can construct a pressure regulating unit 51 and a temperature regulating unit 52 as function blocks when the processor 58 executes the program stored in the flash memory 59.

The pressure regulating unit 51 has a function that adjusts the pressure of the DME fuel flowing through the high-pressure fuel passage 45 by controlling the rail pressure in the common rail 30 according to the operation state of the internal combustion engine 110. The pressure regulating unit 51 adjusts to increase the pressure of the DME fuel in accordance with an increase in load of the internal combustion engine 110, and adjusts to decrease the pressure of the DME fuel in accordance with a decrease in load of the internal combustion engine 110. The pressure regulating unit 51 increases and decreases a discharging quantity that is a quantity of the DME fuel discharged from the supply pump 20 to the common rail 30 to control the rail pressure in the common rail 30.

Specifically, the pressure regulating unit 51 calculates a control target value of the rail pressure according to the operation state of the internal combustion engine 110. The pressure regulating unit 51 loads a present value of the rail pressure from the rail pressure sensor 32. The pressure regulating unit 51 calculates a difference in rail pressure between the control target value and the present value. When the difference becomes larger, the pressure regulating unit 51 controls a valve opening interval of the electromagnetic valve 22 of the supply pump 20 to be longer to increase the discharging quantity of the supply pump 20.

The temperature regulating unit 52 has a function that adjusts the temperature of the DME fuel flowing through the high-pressure fuel passage 45 by controlling a temperature of a fluid in the fuel gallery 49, the water gallery 113 and the oil gallery 114 according to the operation state of the internal combustion engine 110. The temperature regulating unit 52 adjusts to decrease the temperature of the DME fuel in accordance with an increase in load of the internal combustion engine 110, and adjusts to increase the temperature of the DME fuel in accordance with a decrease in load of the internal combustion engine 110. The temperature regulating unit 52 controls the fuel temperature in the high-pressure fuel passage 45 by mainly using an evaporation heat of the DME fuel (return fuel) and the combustion heat transmitted to the DME fuel, the coolant and the lubricating oil. The temperature regulating unit 52 increases and decreases a flow volume of the fluid in each gallery 49, 113 or 114.

Specifically, the temperature regulating unit 52 controls a heating and cooling function of the fuel gallery 49 by adjusting a valve opening rate of the gallery control valve 88a. When the gallery control valve 88a is in an open state, a flowing of the DME fuel is generated in each fuel gallery 49. Since the dimethyl ether has a critical point (5.3 MPa, 127 degrees Celsius) in a lower pressure and lower temperature state than other fuels, it is easy to exceed the critical point. Thus, when the gallery control valve 88a opens, the temperature of the DME fuel of each fuel gallery 49 decreases due to a latent heat of a vaporization and becomes lower than that of the DME fuel of the high-pressure fuel passage 45. Thus, the fuel gallery 49 is equivalent to a cooling passage 62 through which the DME fuel having a low temperature flows around the high-pressure fuel passage 45, and the fuel gallery 49 functions as a cooler 61 that decreases the temperature of the DME fuel of the high-pressure fuel passage 45.

When the gallery control valve 88a is in a closed state, the DME fuel is maintained to be in a liquid phase and is stored in each fuel gallery 49. The temperature of the DME fuel that is stored is increased by the combustion heat transmitted through the copper tube 67 and becomes higher than the DME fuel of the high-pressure fuel passage 45. Thus, the fuel gallery 49 is equivalent to a temperature increasing fuel chamber 64 that increases the temperature of the DME fuel of the high-pressure fuel passage 45 by using a potential heat (heat quantity) of the DME fuel stored in the fuel gallery 49, and the fuel gallery 49 functions as a heater 63 that increases the temperature of the DME fuel of the high-pressure fuel passage 45 together with the copper tube 67. The temperature of the fuel gallery 49 can be adjusted to be around a range from 40 degrees Celsius to 120 degrees Celsius.

The temperature regulating unit 52 controls heating and cooling functions of the galleries 113 and 114 by adjusting valve opening rates of the coolant control valve 68 and the oil control valve 69. When a control of the coolant control valve 68 decreases the flow volume of the coolant flowing through the water gallery 113, the temperature of the coolant that receives the combustion heat of the internal combustion engine 110 becomes higher than the temperature of the DME fuel of the high-pressure fuel passage 45. Similarly, when a control of the oil control valve 69 decreases the flow volume of the lubricating oil flowing through the oil gallery 114, the temperature of the lubricating oil becomes higher than the temperature of the DME fuel of the high-pressure fuel passage 45. Thus, the water gallery 113 and the oil gallery 114 function as the heater 63 that increases the temperature of the DME fuel by a heat exchange between the DME fuel of the high-pressure fuel passage 45 and the coolant and the lubricating oil stored in the water gallery 113 and the oil gallery 114.

When the temperature of the DME fuel of the high-pressure fuel passage 45 is higher than the temperature of the coolant and the temperature of the lubricating oil, the DME fuel flowing through the high-pressure fuel passage 45 can be cooled by increasing the flow volumes of the coolant and the lubricating oil. As the above description, the water gallery 113 and the oil gallery 114 also function as the cooler 61 that cools the DME fuel flowing through the high-pressure fuel passage 45 by flowings of the coolant and the lubricating oil.

Referring to FIGS. 1, 2 and 4 to 6, a specification of a temperature regulating operation achieved by using each gallery 49, 113 or 114 will be described. In the temperature regulating operation, the temperature of the DME fuel is adjusted to be decrease in accordance with an increase in load of the internal combustion engine 110, and the temperature of the DME fuel is adjusted to increase in accordance with a decrease in load of the internal combustion engine 110. The control unit 50 starts the temperature regulating operation shown in FIG. 4 as a flowchart, in a case where an ignition of the vehicle is in an on state. The control unit 50 repeatedly executes the temperature regulating operation shown in FIG. 4 until the ignition of the vehicle is in an off state.

At S10, the control unit 50 loads an operation target of the internal combustion engine 110 based on an engine control map previously stored in the flash memory 59 and operation information of the driver and then proceeds to S20. At S20, the control unit 50 loads the operation state of the internal combustion engine 110 from various sensors mounted to the internal combustion engine 110 and then proceeds to S30. In this case, the operation state is a latest operation state.

At S30, the control unit 50 calculates a control target value Tft of the fuel temperature in the fuel gallery 49 based on the operation target loaded at S10 and the operation state loaded at S20 and then proceeds to S40. The control target value Tft is set to a value decreasing in accordance with an increase in load and rotation speed of the internal combustion engine 110 equivalent to the operation target.

At S40, the control unit 50 outputs the control signal controlling the temperature of the DME fuel of the fuel gallery 49 to the control target value calculated at S30 toward the gallery control valve 88a and then terminates a main routine of the temperature regulating operation. The gallery control valve 88a duty controlled based on the control signal outputted at S40 changes the fuel pressure of the fuel gallery 49, increases and decreases an evaporation quantity of the DME fuel in the fuel gallery 49, and makes the fuel gallery 49 performs in an optimal cooling ability. When a value of the on-duty ratio set by a sub routine becomes equal to or smaller than zero, the gallery control valve 88a maintains to be in the closed state.

Figure 5:
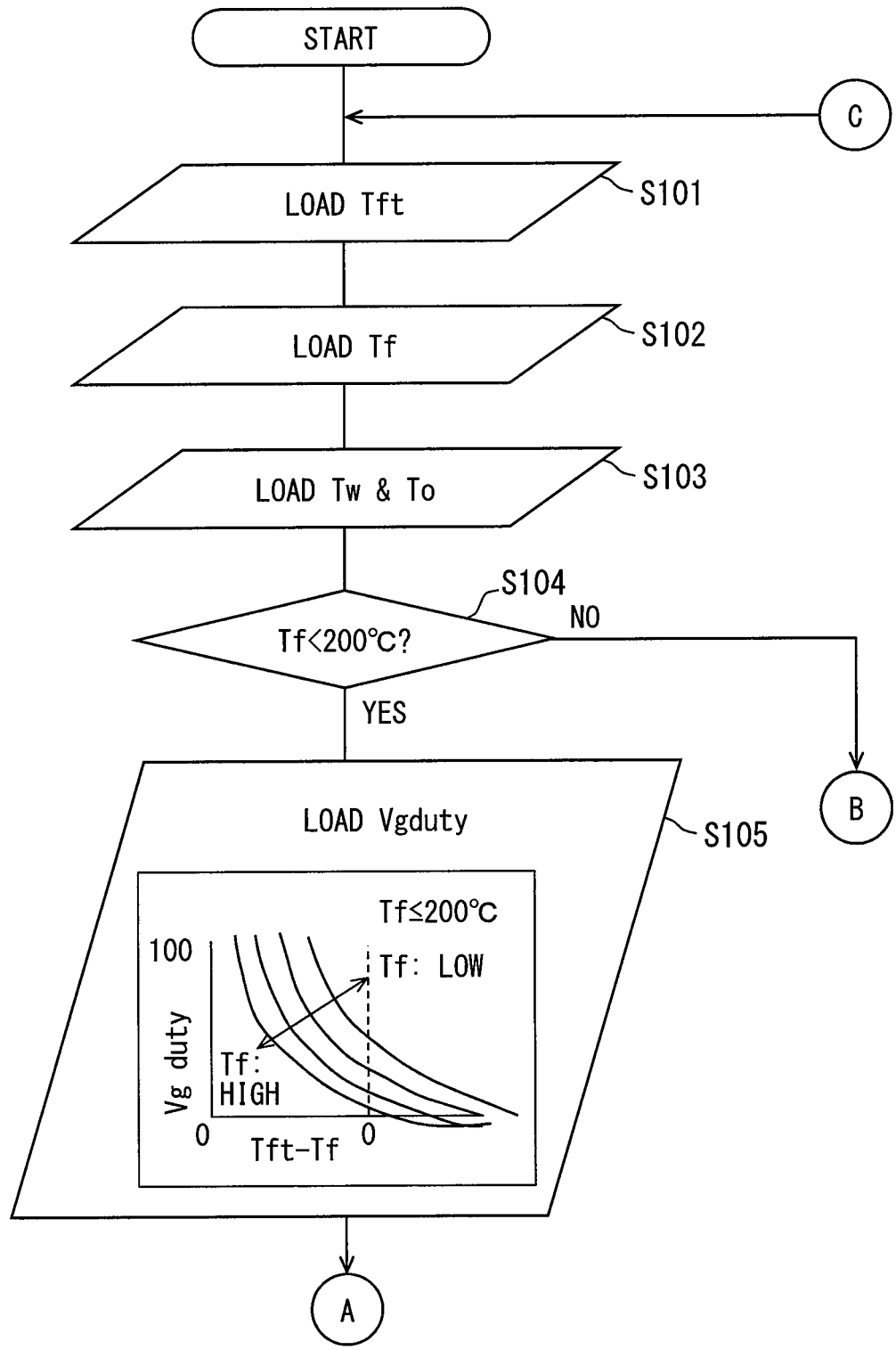
FIG. 5 is a flowchart showing a sub routine of the temperature regulating operation with FIG. 6.
Figure 6:
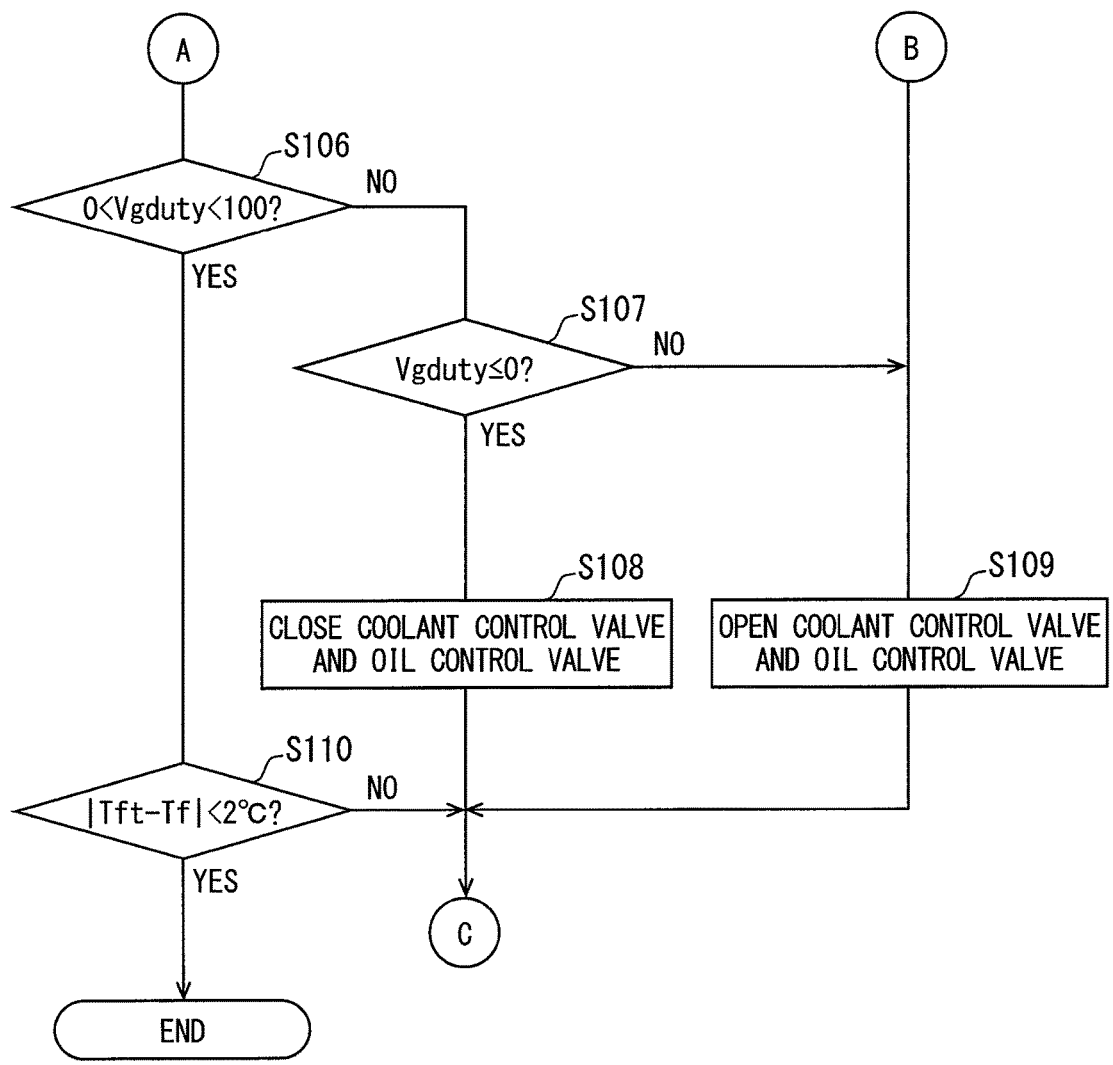
FIG. 6 is a flowchart showing the sub routine of the temperature regulating operation with FIG. 5.

Next, referring to FIGS. 5 and 6, the sub routine where the on-duty ratio (Vgduty) of the control signal that starts an output at S40 is set will be described. The control unit 50 repeatedly executes the sub routine in a case where the ignition of the vehicle is in the on state the same as the main routine.

At S101, the control unit 50 loads the control target value Tft calculated at S30 of the main routine and then proceeds to S102. At S102, the control unit 50 loads the fuel temperature Tf of the DME fuel flowing through the high-pressure fuel passage 45 based on an output signal of the fuel temperature sensor 48 and then proceeds to S103. At S103, the control unit 50 loads a water temperature Tw that is the temperature of the coolant and an oil temperature To that is the temperature of the lubricating oil and then proceeds to S104.

At S104, the control unit 50 determines whether the fuel temperature Tf loaded at S102 is lower than 200 degrees Celsius. When the control unit 50 determines that the fuel temperature Tf is higher than or equal to 200 degrees Celsius at S104, the control unit 50 proceeds to S109 to decrease the fuel temperature Tf that is excessively increased. When the control unit 50 determines that the fuel temperature Tf is lower than 200 degrees Celsius at S104, the control unit 50 proceeds to S105. An upper limit value of the fuel temperature Tf is set to a temperature lower than or equal to a heat processing temperature (annealing temperature) of the nozzle body 41 and the nozzle needle 42.

At S105, the control unit 50 calculates a temperature difference $\Delta t$ between the control target value Tft loaded at S101 and the fuel temperature Tf loaded at S102. The control unit 50 acquires the on-duty ratio of the control signal outputted to the gallery control valve 88a from the temperature difference $\Delta t$ that is calculated. Specifically, at S105, the control unit 50 loads the on-duty ratio of the control signal corresponding to the temperature difference $\Delta t$ from a valve control map stored in the flash memory 59 and proceeds to S106.

In the valve control map used at S105, relations between the temperature difference $\Delta t$ and the on-duty ratio in each fuel temperature Tf are set in a region where the fuel temperature Tf is lower than 200 degrees Celsius. The on-duty ratio is a value increasing in accordance with a decrease in control target value Tft and a decrease in fuel temperature Tf. The on-duty ratio is set to be smaller than or equal to 100. In a region of the control map where the on-duty ratio is smaller than or equal to zero, the fuel temperature is excessively decreased, and a heating using the coolant and the lubricating oil is executed.

At S106, the control unit 50 determines whether the value of the on-duty ratio loaded at S105 exceeds zero and is smaller than 100. When the control unit 50 determines that the value of the on-duty ratio exceeds zero and is smaller than 100 at S106, the control unit 50 proceeds to S110.

When the control unit 50 determines that the value of the on-duty ratio is smaller than or equal to zero or is equal to 100 at S106, the control unit 50 proceeds to S107.

At S107, the control unit 50 determines whether the on-duty ratio is smaller than or equal to zero. When the control unit 50 determines that the on-duty ratio is smaller than or equal to zero at S107, the control unit 50 proceeds to S108. At S108, the control unit 50 outputs the control signal that closes the coolant control valve 68 and the oil control valve 69 or decreases the valve opening rates so as to correct an excessive decreasing of the temperature of the DME fuel in the fuel gallery 49 and then returns to S101. According to S108, the water gallery 113 and the oil gallery 114 function as the heater 63.

When the control unit 50 determines that the on-duty ratio is equal to 100 at S107, the control unit 50 proceeds to S109. At S109, the control unit 50 outputs the control signal that opens the coolant control valve 68 and the oil control valve 69 or increases the valve opening rates so as to correct an excessive increasing of the temperature of the DME fuel in the fuel gallery 49 and then returns to S101. According to S109, the water gallery 113 and the oil gallery 114 function as the cooler 61. In addition, at S108 and S109, the valve opening rates of the coolant control valve 68 and the oil control valve 69 can be corrected according to the water temperature Tw of the coolant and the oil temperature To of the lubricating oil loaded at S103.

At S110 after a positive determination of S106, the control unit 50 determines whether an absolute value of the temperature difference Δt between the control target value Tft and the fuel temperature Tf is lower than a threshold that is predetermined. According to the present embodiment, the threshold is 2 degrees Celsius. When the control unit 50 determines that the absolute value of the temperature difference Δt is higher than or equal to the threshold at S110, the control unit 50 returns to S101 to continue to adjust the fuel temperature Tf to be the control target value Tft. When the control unit 50 determines that the absolute value of the temperature Δt is lower than the threshold, the control unit 50 determines that the fuel temperature Tf is substantially equal to the control target value Tft and terminates the present sub routine.

According to the first embodiment, the fuel injection device 100 uses a phenomenon that a physical property of the DME fuel remarkably changes according to the temperature and the pressure of the DME fuel. When the pressure of the DME fuel is increased and the temperature of the DME fuel is decreased in the high-pressure fuel passage 45, the density of the DME fuel increases. Thus, the injection rate of the DME fuel injected from the injection port 44 increases, and the spray injected from the injection port 44 has a strong penetration force.

When the pressure of the DME fuel is decreased and the temperature of the DME fuel is increased in the high-pressure fuel passage 45, the density of the DME fuel decreases. Thus, the injection rate of the DME fuel injected from the injection port 44 decreases, and the spray injected from the injection port 44 has a weak penetration force. As the above description, the fuel injection device 100 injecting the DME fuel can execute the injection of the spray to suit the operation state of the internal combustion engine 110 by adjusting the temperature and the pressure of the DME fuel of the high-pressure fuel passage 45 to suit the operation state using the temperature regulating unit 52 and the pressure regulating unit 51.

According to the present embodiment, the fuel injection device 100 controls to increase the pressure of the DME fuel and to decrease the temperature of the DME fuel in accordance with an increase in rotation speed of the internal combustion engine 110 and an increase in load of the internal combustion engine 110 when the internal combustion engine 110 is in a high-speed high-load state, and injects the DME fuel with a large quantity in a short time interval in a state where the DME fuel is readily atomized to completely mix with an air. Thus, a combustion time interval is decreased, and a high output is achieved. The fuel injection device 100 controls to decrease the pressure of the DME fuel and to increase the temperature of the DME fuel in accordance with a decrease in rotation speed of the internal combustion engine 110 and a decrease in load of the internal combustion engine 110 when the internal combustion engine 110 is in a low-speed low-load state, and reduces a contact between a wall surface of the combustion chamber 115 and the spray and a contact between the wall surface and a combustion flame by injecting the spray having a low injection rate and a weak penetration force. Since the DME fuel is a fuel that is readily vaporized, it is difficult that the DME fuel is injected at a low pressure to generate a spray having a droplet diameter the same level as a liquid fuel. Thus, a cooling loss can be suppressed and a mixing can be improved, and a high heat efficiency can be achieved. As the above description, the fuel injection device 100 can provide the injection and the spray that suit the high-speed high-load state and the low-speed low-load state.

According to the first embodiment, when the cooler 61 decreases the temperature of the DME fuel, a regulating width of the fuel temperature of the high-pressure fuel passage 45 can be ensured to be wide. Similarly, when the heater 63 increases the temperature of the DME fuel, the regulating width of the fuel temperature of the high-pressure fuel passage 45 can be ensured to be wide. As the above description, the fuel injection device 100 can certainly generate the spray according to the operation state of the internal combustion engine 110.

According to the first embodiment, the fuel gallery 49 functions as the cooler 61 by using the latent heat of the vaporization of the DME fuel, and a cooling of the DME fuel that is injected is achieved. Further, the fuel gallery 49 functions as the heater 63 by using the combustion heat transmitted to the DME fuel, and a heating of the DME fuel that is injected is achieved. In the above configuration, the regulating width of the fuel temperature can be ensured to be wide without adding a complicated system for the cooling and the heating. Thus, the fuel injection device 100 can certainly generate the spray according to the operation state with a configuration that has a high implementability.

According to the first embodiment, the fuel gallery 49 can function as both the cooler 61 and the heater 63. Thus, the regulating width of the fuel temperature can be ensured to be wide without complicating a configuration of the periphery of the injector 40. Further, the cooling and the heating of the DME fuel that is injected can be executed at a position in the high-pressure fuel passage 45 in the vicinity of the injection port 44.

According to the first embodiment, the DME fuel of the high-pressure fuel passage 45 is cooled and heated by using the coolant and the lubricating oil of the internal combustion engine 110. In the above configuration, the regulating width of the fuel temperature can be ensured to be wide without adding a complicated system for adjusting the temperature of the DME. Thus, the fuel injection device 100 can certainly generate the spray according to the operation state with a configuration that has a high implementability.

According to the first embodiment, the DME fuel can be controlled to be in a super-critical state. Thus, the spray that is injected has a property substantially the same as that of a gas. The DME fuel that is injected from the injection port 44 in a state the same as a gaseous spray can be certainly atomized. Further, the injection port 44 that is the Laval shape can inject the spray having a low injection rate and a weak penetration force at the sound speed. As the above description, the sound speed of the DME fuel remarkably changes according to the temperature and the pressure of the DME fuel. Thus, a change of a momentum of the spray injected from the injection port 44 can be generated when a control of the temperature and the pressure is executed to increase and decrease the sound speed, and the spray travelling distance of the spray in a low-pressure high-temperature state. The spray travelling distance of the spray in the high-pressure low-temperature state depends on a pressure difference between an interior and an exterior of the injection port 44 based on the Bernoulli's theorem.

According to the first embodiment, the nozzle body 41 is equivalent to a passage forming member, the high-pressure fuel passage 45 is equivalent to a fuel passage, and the water gallery 113 and the oil gallery 114 are equivalent to a heat exchanging passage.

Second Embodiment

Figure 7:
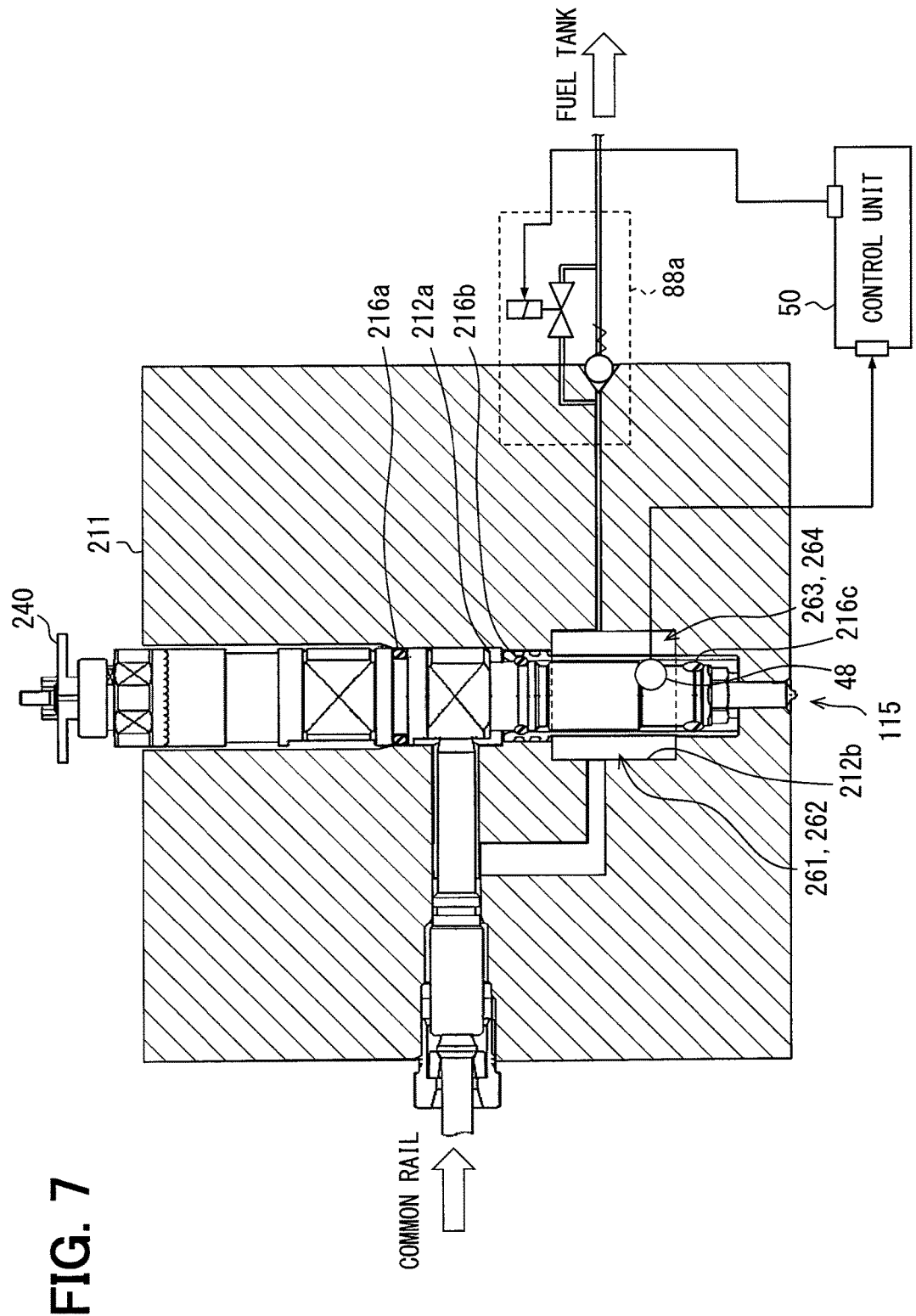
FIG. 7 is a cross-sectional view showing the constitution of the periphery of the injector, according to a second embodiment of the present disclosure.

A second embodiment of the present disclosure as shown in FIG. 7 is a modification example of the first embodiment. According to the second embodiment, a constitution equivalent to the water gallery 113 and the oil gallery 114 of the first embodiment (refer to FIG. 2) is cancelled from a cylinder head 211. Further, a constitution equivalent to the fuel gallery 49 of the first embodiment (refer to FIG. 2) is located in the cylinder head 211 as a second fuel gallery 212*b*.

The cylinder head 211 includes a first fuel gallery 212*a* and the second fuel gallery 212*b*. The first fuel gallery 212*a* and the second fuel gallery 212*b* are partitioned by the cylinder head 211, an injector 240 and plural O-rings 216*a* to 216*c*. The injector 240 has a shape that a cross-sectional area of the injector 240 stepwisely decreases in accordance with a decrease in distance between a position and a tip end of the injector 240, and the injector 240 can be mounted to the cylinder head 211. The O-rings 216*a* to 216*c* have diameters that are decreases corresponding to the shape of the injector 240. Specifically, the diameters of the O-rings 216*a* to 216*c* decrease in accordance with a decrease in distance between a position of one corresponding O-ring and the tip end of the injector 240.

The first fuel gallery 212*a* is a member equivalent to the head gallery 112 of the first embodiment (refer to FIG. 1). A leakage fuel that is the fuel leaked from the injector 240 flows into the first fuel gallery 212*a*.

The first fuel gallery 212*a* and the second fuel gallery 212*b* are arranged in an axial direction of the injector 240. The second fuel gallery 212*b* is interposed between the first fuel gallery 212*a* and the combustion chamber 115. The second fuel gallery 212*b* is a space partitioned to have a cylindrical shape around an outer periphery of the injector 240. The DME fuel flows into the second fuel gallery 212*b* through a branch passage defined in the cylinder head 211.

The control unit 50 obtains the fuel temperature in the second fuel gallery 212*b* measured by the fuel temperature sensor 48. The gallery control valve 88*a* controls an outflow of the fuel from the second fuel gallery 212*b*. The gallery control valve 88*a* is connected with the control unit 50 and executes operations to open and to close based on the control signal transmitted from the control unit 50.

According to the second embodiment, the second fuel gallery 212*b* can be equivalent to a cooling passage 262 and a temperature increasing fuel chamber 264 according to the operations of the gallery control valve 88*a* and can be equivalent to a cooler 261 and a heater 263 that adjust the temperature of the DME fuel that is injected. Thus, similar to the first embodiment, a regulation of the temperature and the pressure of the DME fuel in the injector 240 is achieved. Thus, the injector 240 can execute the injection of the spray to suit the operation state.

Other Embodiment

The present disclosure is described according to the above embodiments. However, the present disclosure is not limited to the embodiment mentioned above, and can be applied to various embodiments within the spirit and scope of the present disclosure.

According to the above embodiments, the fuel gallery, the water gallery and the oil gallery that are located in the injector and the cylinder head function as the cooler and the heater. However, a member or a constitution executing the cooling and the heating of the DME fuel is not limited to the above members. For example, an electric heater that heats the lubricating oil flowing into the oil gallery can be used. Alternatively, a constitution using a heat of an exhaust gas to increase the temperature of the DME fuel by the lubricating oil heated by a heat exchange at an EGR cooler can be used.

According to the above embodiments, the dimethyl ether is mentioned as the liquefied gas fuel. However, the liquefied gas fuel is not limited to the dimethyl ether. For example, the liquefied gas fuel may be a fuel including the dimethyl ether. Further, a liquefied petroleum gas can be used as the liquefied gas fuel.

Since the dimethyl ether has a boiling point (−25 degrees Celsius) that is low and a vapor pressure is high, the dimethyl ether is readily vaporized and mixed with the air. Since the dimethyl ether has a cetane number that is high, the dimethyl ether is readily ignited. The dimethyl ether is more readily ignited than a light oil is. Further, since the dimethyl ether is a fuel including oxygen and a carbon double bond of the dimethyl ether does not occur, it is difficult to discharge a black smoke or a particulate matter. A discharging quantity of a carbon dioxide from the dimethyl ether is smaller than that from the light oil.

The fuel injection device to which the present disclosure is applied to can be used to associate with an internal combustion engine mounted to a vehicle, a ship, a railway car or an aircraft or an internal combustion engine used to generate power, so as to inject the fuel into a combustion chamber of the internal combustion engine.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The invention claimed is:

1. A fuel injection device injecting a liquefied gas fuel from an injection port to a combustion chamber of an internal combustion engine, the fuel injection device comprising:
   a passage forming member configured to define a fuel passage through which the liquefied gas fuel flows to the injection port;
   a temperature regulating unit configured to adjust a temperature of the liquefied gas fuel flowing through the fuel passage according to an operation state of the internal combustion engine; and
   a pressure regulating unit configured to adjust a pressure of the liquefied gas fuel flowing through the fuel passage according to the operation state of the internal combustion engine.

2. The fuel injection device according to claim 1, wherein the temperature regulating unit adjusts to decrease the temperature of the liquefied gas fuel in accordance with an increase in load of the internal combustion engine.

3. The fuel injection device according to claim 1, wherein the pressure regulating unit adjusts to increase the pressure of the liquefied gas fuel in accordance with an increase in load of the internal combustion engine.

4. The fuel injection device according to claim 1, wherein the temperature regulating unit controls a cooler to decrease the temperature of the liquefied gas fuel of the fuel passage.

5. The fuel injection device according to claim 4, wherein the cooler defines a cooling passage through which the liquefied gas fuel flows around the passage forming member, and cools the liquefied gas fuel flowing through the fuel passage by a latent heat of a vaporization of the liquefied gas fuel flowing through the cooling passage.

6. The fuel injection device according to claim 1, wherein the temperature regulating unit controls a heater to increase the temperature of the liquefied gas fuel of the fuel passage.

7. The fuel injection device according to claim 6, wherein the heater defines a heat exchanging passage around the passage forming member and increases the temperature of the liquefied gas fuel flowing through the fuel passage by storing at least one of a coolant of the internal combustion engine and a lubricating oil of the internal combustion engine in the heat exchanging passage.

8. The fuel injection device according to claim 6, wherein the heater defines a temperature increasing fuel chamber storing the liquefied gas fuel around the passage forming member, and increases the temperature of the liquefied gas fuel flowing through the fuel passage by a potential heat of the liquefied gas fuel of the temperature increasing fuel chamber.

9. The fuel injection device according to claim 1, wherein the temperature regulating unit is configured to decrease the temperature of the liquefied gas fuel flowing through the fuel passage and the pressure regulating unit is configured to increase the pressure of the liquefied gas fuel flowing through the fuel passage to thereby increase a density of the liquefied gas fuel.

10. The fuel injection device according to claim 1, wherein
   the temperature regulating unit is configured to increase the temperature of the liquefied gas fuel flowing through the fuel passage and the pressure regulating unit is configured to decrease the pressure of the liquefied gas fuel flowing through the fuel passage to thereby decrease a density of the liquefied gas fuel.

11. The fuel injection device according to claim 1, wherein
   the temperature regulating unit is configured to decrease the temperature of the liquefied gas fuel flowing through the fuel passage and the pressure regulating unit is configured to increase the pressure of the liquefied gas fuel flowing through the fuel passage to thereby increase an injection rate of the liquefied gas fuel.

12. The fuel injection device according to claim 1, wherein
   the temperature regulating unit is configured to increase the temperature of the liquefied gas fuel flowing through the fuel passage and the pressure regulating unit is configured to decrease the pressure of the liquefied gas fuel flowing through the fuel passage to thereby decrease an injection rate of the liquefied gas fuel.

* * * * *